US009394740B2

(12) United States Patent
Reymann et al.

(10) Patent No.: US 9,394,740 B2
(45) Date of Patent: Jul. 19, 2016

(54) FAILSAFE OPERATION FOR UNMANNED GATELINES

(71) Applicant: Cubic Corporation, San Diego, CA (US)

(72) Inventors: Steffen Reymann, Reigate (GB); Gavin Smith, Crawley (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/700,403

(22) Filed: Apr. 30, 2015

(65) Prior Publication Data

US 2015/0315840 A1 Nov. 5, 2015

Related U.S. Application Data

(60) Provisional application No. 61/986,704, filed on Apr. 30, 2014.

(51) Int. Cl.

| | |
|---|---|
| ***E05F 15/72*** | (2015.01) |
| ***E05F 1/00*** | (2006.01) |
| ***E05F 15/40*** | (2015.01) |
| ***E05F 15/75*** | (2015.01) |
| ***E06B 11/08*** | (2006.01) |
| ***G08B 21/02*** | (2006.01) |

(Continued)

(52) U.S. Cl.

CPC ................. *E05F 15/72* (2015.01); *E05F 1/006* (2013.01); *E05F 15/40* (2015.01); *E05F 15/75* (2015.01); *E06B 11/08* (2013.01); *G07C 9/00126* (2013.01); *G08B 21/02* (2013.01); *E05F 2015/765* (2015.01); *E05F 2015/767* (2015.01)

(58) Field of Classification Search

CPC ........ G07C 9/00111; G07C 9/02; G07C 9/00; E05F 15/00; E05F 15/76; E05F 15/40

See application file for complete search history.

(56) References Cited

U.S. PATENT DOCUMENTS

| | | | | |
|---|---|---|---|---|
| 5,003,290 A | 3/1991 | Lindquist | | |
| 2003/0112119 A1 * | 6/2003 | Hom | .................. | H04M 11/022 340/5.2 |

(Continued)

FOREIGN PATENT DOCUMENTS

| | | |
|---|---|---|
| JP | H1171946 A | 3/1999 |
| WO | 2008-013359 A1 | 1/2008 |

OTHER PUBLICATIONS

International Search Report and Written Opinion of PCT/US2015/028480 mailed Nov. 6. 2015, all pages.

*Primary Examiner* — James Yang

(74) *Attorney, Agent, or Firm* — Kilpatrick Townsend & Stockton LLP

(57) ABSTRACT

Systems and techniques are presented for enabling fail-safe operation of an automatic pedestrian access control gate during a health and safety event. Gateline sensor data is received from at least one gateline sensor. The gateline sensor data indicates that an event concerning health and safety has occurred. An alert is generated in response to receiving the gateline sensor data. The alert is transmitted to a remote monitoring device that is remote from the access control gate. A determination is made that a preset amount of time has elapsed since transmitting the alert. A further determination is made that an acknowledgement of the alert has not been received. Based on determining that the preset amount of time has elapsed and determining that the acknowledgement has not been received, a predefined action is triggered.

7 Claims, 5 Drawing Sheets

(51) Int. Cl.
*G07C 9/00* (2006.01)
*E05F 15/73* (2015.01)

(56) References Cited

U.S. PATENT DOCUMENTS

2006/0101716 A1 5/2006 Vandyck et al.
2009/0022362 A1* 1/2009 Gagvani ................ G06T 7/2053 382/100
2013/0120108 A1* 5/2013 Kocznar ................ E06B 11/085 340/5.7
2013/0205666 A1* 8/2013 Fortin ................. E05F 15/2023 49/13
2014/0015978 A1 1/2014 Smith et al.

* cited by examiner

FAILSAFE OPERATION FOR UNMANNED GATELINES

CROSS-REFERENCES TO RELATED APPLICATIONS

This application claims the benefit of U.S. Provisional Patent Application No. 61/986,704, filed Apr. 30, 2014, entitled "FAILSAFE OPERATION FOR UNMANNED GATELINES," the entire disclosure of which is hereby incorporated by reference for all purposes.

BACKGROUND

1. The Field of the Invention

The present invention generally relates to access control gates. More specifically, the present invention relates to fail-safe operation of access control gates during health and safety events.

2. The Relevant Technology

A turnstile is a commonly found example of an access control gate that can be placed at entry or exit gatelines to process pedestrians through the gate. The turnstile ensures that pedestrians can only pass through the gate in one direction and only one pedestrian can pass through at a time. A payment device can be used in conjunction with a turnstile to automate the fee collection and access granting processes. For example, a payment device that accepts coins, tokens, tickets, or cards can be placed next to the turnstile and can operate the turnstile to grant passage only if a valid payment has been received.

Turnstiles with payment devices can be used in a wide variety of settings to restrict access to paying customers. While turnstiles are most commonly found in mass transit systems, they can also be utilized at stadiums and sporting events, amusement parks and attractions, or any other setting where payment is collected in exchange for access to a restricted area.

BRIEF SUMMARY

In one embodiment, a system for enabling fail-safe operation of an automatic pedestrian access control gate during a health and safety event is presented. The system includes a gate paddle configured to operate in an open state and a locked state. Pedestrian passage through the access control gate is granted while the gate paddle is operating in the open state, and pedestrian passage through the access control gate is blocked while the gate paddle is operating in the locked state. The system further includes a gate paddle sensor configured to detect a position of the gate paddle and a computer server system coupled to the gate paddle and the gate sensor. The computer server system is configured to receive gate paddle sensor data from the gate paddle sensor that indicates the position of the gate paddle. Based on the gate paddle sensor data, the computer server system determines that the gate paddle is stuck in an unnatural position that is different from a natural resting position of the gate paddle during normal operation. The computer server system is further configured to determine that the gate paddle is currently operating in the locked state. Based on determining that the gate paddle is stuck in the unnatural position and determining that the gate paddle is currently operating in the locked state, the computer server system transmits a signal to the gate paddle that causes the gate paddle to operate in the open state.

In another embodiment, a method for enabling fail-safe operation of an automatic pedestrian access control gate during a health and safety event is presented. The method includes receiving gateline sensor data from at least one gateline sensor. The gateline sensor data indicates that the event concerning health and safety has occurred. An alert is generated in response to receiving the gateline sensor data and the alert is transmitted to a remote monitoring device. The remote monitoring device is remote from the access control gate. The method further includes determining that a preset amount of time has elapsed since the alert was transmitted and determining that an acknowledgement of the alert has not been received. Based on determining that the preset amount of time has elapsed and determining that the acknowledgement has not been received, a predefined action is triggered.

In a further embodiment, a non-transitory computer-readable medium is presented. The non-transitory computer-readable medium has instructions stored therein, which when executed cause a computer to perform a set of operations including establishing a wireless communication link with a plurality of mobile devices. Status data is received from each of the plurality of mobile devices. The status data indicates whether each mobile device is being actively monitored. Gateline sensor data is received from at least one gateline sensor. The gateline sensor data indicates that an event concerning health and safety has occurred. Further operations include determining a monitoring status for each mobile device based on the received status data and determining that none of the plurality of mobile devices are being actively monitored based on the monitoring status of each mobile device. Based on receiving the gateline sensor data and determining that none of the plurality of mobile devices are being actively monitored, a signal is transmitted to a pedestrian access control gate. The signal causes the pedestrian access control gate to operate according to a predefined action.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims. Further, when a particular feature, structure, or characteristic is described in connection with an embodiment, it is submitted that it is within the knowledge of one skilled in the art to implement such feature, structure, or characteristic in connection with other embodiments whether or not explicitly described.

Pedestrian access control gates such as turnstiles can be placed at ingress and egress gatelines for controlling access to restricted areas and to process pedestrians through the gatelines in an orderly fashion. A payment device such as a coin collector or card reader can be used in conjunction with an access control gate to fully automate the payment collection and access granting process. This can reduce or eliminate staffing requirements at entry gates to produce substantial savings in operating costs. However, health and safety regulations require gatelines to be manned by staff when in operation to provide a prompt response in case of an emergency situation. For example, a pedestrian might get stuck in the gate paddles of a turnstile and assistance might be required to prevent injuries.

Embodiments described herein present systems and techniques for enabling fail-safe operation of automated pedestrian access control gates during health and safety events to allow mobilization of staff while maintaining a high level of passenger safety at all times. Some embodiments are directed toward helping ensure passenger safety around unmanned, but remotely monitored, gatelines with the inclusion of a fail-safe mechanism that automatically triggers emergency open functions or other predefined actions on the gateline if no satisfactory response has been received from staff or a gateline monitoring system in a timely manner. This can be during general unstaffed gateline operation or in response to an alert from the gateline itself, which can be generated directly by gateline sensors or after some form of processing, for instance, by a video analytics system. Although examples and embodiments provided herein are described in the context of public transit systems, it is understood that embodiments are not so limited. Rather, the concepts described herein may be implemented in any environment where a pedestrian access control gate may be found, such as sports stadiums, music halls, movie theatres and amusement parks.

Figure 1:
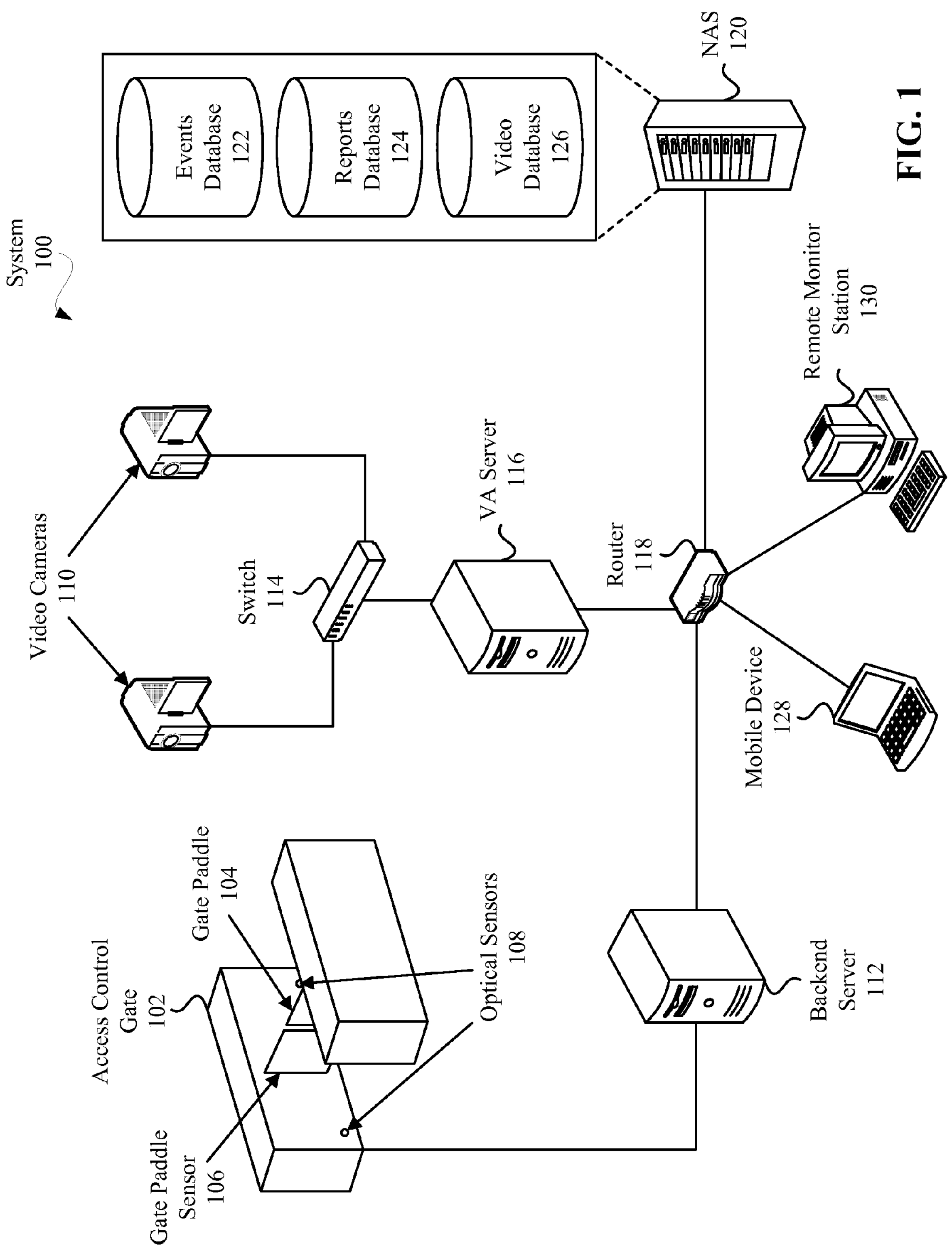
FIG. 1 is an illustration of an example embodiment of a system for enabling fail-safe operation of an automatic pedestrian access control gate during a health and safety event.

FIG. 1 is an illustration of an example embodiment of a system 100 for enabling fail-safe operation of an automatic pedestrian access control gate during a health and safety event. In this embodiment, system 100 includes an access control gate 102, which further includes a gate paddle 104. Gate paddle 104 can perform the function of automatically granting access to a user when fare is collected by, for example, opening or unlocking to allow passage. Thus, gate paddle 104 can operate in an open (i.e., unlocked) state that allows passage through gate 102, and in a locked state that blocks passage. Although access control gate 102 is illustrated as a flap gate in this figure, it is understood that any type of access control gates can be used to implement the embodiments described herein, including rotating turnstiles. Furthermore, while only one access control gate 102 is illustrated in this figure for clarity, it is understood that system 100 can include any number of gates.

System 100 also includes several different types of gateline sensors for detecting passengers that walk through the gate 102. In this embodiment, system 100 includes a gate paddle sensor 106 for detecting the position of gate paddle 104, one or more optical sensors 108 (e.g., infrared sensors) for detecting the presence of a pedestrian (or other object) within the passageway of gate 102, and one or more video cameras 110 aimed at an area that includes gate 102. Gate paddle sensor 106 can be implemented as, for example, one or more Hall sensors that can detect gate paddle 104 at the closed position (i.e., the natural resting position of gate paddle 104) or at the fully open position. Gate paddle sensor 106 can also be implemented as one or more capacitive displacement sensors or other type of position sensors that provide detailed readings on the exact position of gate paddle 104 at any given time.

In this embodiment, gate paddle sensor 106 and optical sensors 108 are coupled with backend server 112, and video cameras 110 are coupled with video analytics (VA) server 116 via switch 114. Switch 114 allows VA server 116 to communicate simultaneously with multiple cameras by, for example, using packet switching or some other switching technology. VA server 116 receives video feeds from cameras 110 and analyzes the video feeds to detect health and safety events. For example, predetermined motions or images can be matched with motions or images from a video feed to detect certain events, such as a pedestrian staying in the passageway of gate 102 for an extended period of time (i.e., greater than or equal to a preset threshold), or a pedestrian that is in an unusual position (e.g., hunched over) or performing an unusual gesture (e.g., waving for help) while in the passageway.

Backend server 112 and VA server 116 are coupled with router 118 to establish communication between the two servers 112 and 116. This enables the combination of data from the different types of sensors 106-110 to provide more accurate detection of health and safety events. For example, if data from gate paddle sensor 106 indicates that gate paddle 104 is stuck in an unnatural position (e.g., half open for greater than or equal to a preset time period threshold), data from optical sensors 108 indicates that a pedestrian is within the passageway of gate 102 (e.g., the first optical sensor located at the entrance of the passageway has been triggered but the second optical sensor located at the exit has not been triggered), and video analytics results indicate that the pedestrian is in an unusual position or performing an unusual gesture, then it can be determined with a great degree of certainty that a health and safety event has occurred. On the other hand, if only one or two types of sensors indicate a health and safety event, then a lesser degree of certainty can be associated with the health and safety event. It is understood that in other embodiments, the components of system 100 can be coupled in different ways while still providing for the same communication capabilities. For example, cameras 110 can be coupled with router 118 to establish communication with VA server 116, rather than through switch 114. Furthermore, backend server 112 and VA server 116 can be implemented as different software modules within a single server, rather than as two separate servers.

Router 118 is further coupled with network attached storage (NAS) 120, which can include one or more databases. NAS 120 stores data for system 100 that is used to enable fail-safe operations and perform other functions and features described herein. NAS 120 can be any type of storage device that is accessible over a network, including a storage area network (SAN). In other embodiments, the databases can be stored in one of the servers 112 or 116 rather than on a separate physical machine dedicated to data storage.

In this embodiment, NAS 120 stores an events database 122, a reports database 124 and a video database 126. Events database 122 can be used to store specific details regarding health and safety events that have been detected, such as the date and time that the event occurred, the duration of the event, the severity of the event, the certainty with which the event was detected, sensor data corresponding to the event, information identifying the passenger(s) involved with the event, contact information for the involved passenger(s), and the resolution or outcome of the event.

Reports database 124 can be used to store reports that have been generated for health and safety events. In one embodiment, events that are stored in events database 122 can be processed periodically, such as every month, quarter, or year, to generate a report of all health and safety events that occurred during the period. The events in a report can be categorized based on severity or certainty, or any other attribute of the events. Furthermore, different portions of the report can be transmitted to different users or user types of system 100. For example, the portion of the report corresponding to the most severe events (e.g., events that involve severe physical injuries or required immediate medical assistance) can be transmitted to accounts (e.g., email accounts) of managers, while the portion corresponding to less severe events can be transmitted to administrators or staff.

Video database 126 can be used to store videos generated by cameras 110. In some embodiments, video database 126 only stores a clip of a video corresponding to a detected health and safety event, rather than the entire video feed, to reduce memory requirements and processing times. The duration of the stored clip can be determined based on the video analysis or the stored clip can have a predetermined duration. For example, video analysis can be performed to determine the start time and end time of the event. Alternatively, a predetermined duration can be used for all clips (e.g., 10 second duration or 30 second duration), or the duration can be selected from a number of predetermined durations based on the severity or certainty of the event that is detected.

System 100 also includes mobile device 128 and remote monitoring station 130. Mobile device 128 can be, for example, a smartphone, tablet, or laptop carried by staff and communicatively coupled with router 118 via a wireless connection, such as Wi-Fi or 3G/4G/LTE cellular connection. Remote monitor station 130 can have a wired connection to router 118 and can be located remotely from gate 102. Mobile device 128 and remote monitor station 130 can be used to alert staff when a health and safety event is detected. In one embodiment, the alert can be transmitted to different users or user types depending on severity (e.g., alerts for severe events are transmitted to managers while alerts for less severe events are transmitted to staff). Additionally, a video clip of the event can be transmitted to mobile device 128 or remote monitor station 130 along with the alert to help staff determine an appropriate response (e.g., what items to bring) and/or response time. Although only one mobile device 128 and one remote monitor station 130 is depicted in this figure for clarity, it is understood that system 100 can include any number of mobile devices and remote monitoring stations.

Figure 2:
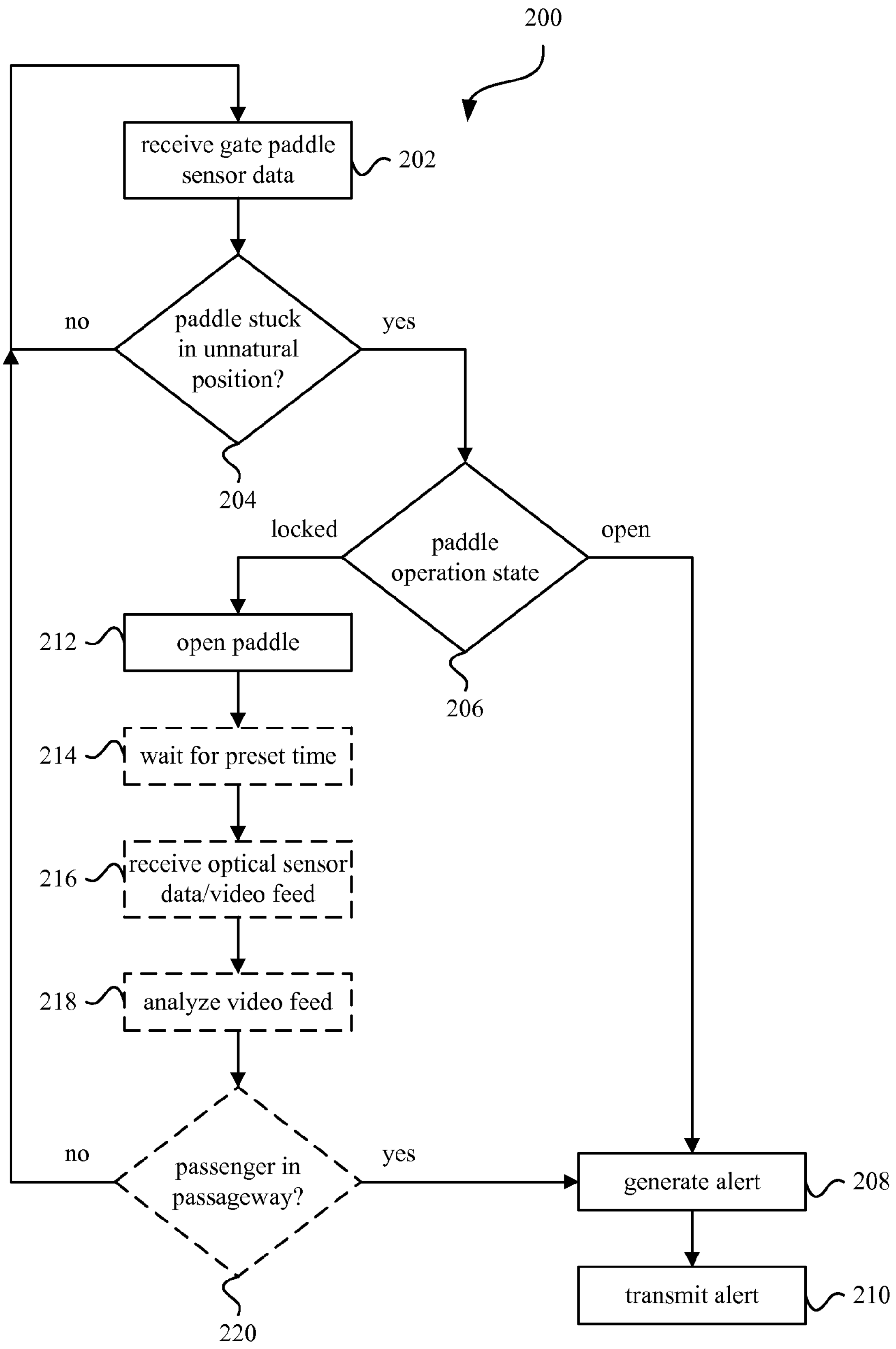
FIG. 2 is a flowchart of one embodiment of a process for enabling fail-safe operation of an automatic pedestrian access control gate during a health and safety event.

FIG. 2 is a flowchart of one embodiment of a process 200 for enabling fail-safe operation of an automatic pedestrian access control gate during a health and safety event. More specifically, this embodiment relates to fully automated emergency gateline operations, including detection, resolution, after event monitoring and reporting of events. Process 200 can be performed by, for example, backend server 112 and VA server 116 as illustrated in FIG. 1.

Process 200 starts at block 202, wherein gate paddle sensor data is received. The gate paddle sensor data indicates the position of the gate paddle. At block 204, a decision is made based on the gate paddle sensor data of whether the gate paddle is stuck in an unnatural position different than the natural resting position. A stuck gate paddle can indicate that a health and safety event has occurred (e.g., a pedestrian is trapped in the gate paddle). The gate paddle can be determined to be stuck in the unnatural position by, for example, tracking the period of time that the gate paddle has been in the unnatural position and determining that that the period of time is greater than or equal to a preset threshold. If the gate paddle is not stuck, process 200 returns to block 202 and blocks 202 and 204 are repeated until a stuck gate paddle is detected. If the gate paddle is determined to be stuck at block 204, then process 200 continues to block 206.

At block 206, a decision is made based on the operation state of the gate paddle. If it is determined that the gate paddle is already operating in the open state, process 200 continues to block 208 wherein an alert is generated. Since the gate paddle is already open, automatic resolution of the situation is not possible and staff response is required. At block 210, the alert is transmitted to, for example, a mobile device carried by staff or a remote monitoring station to notify staff of the situation. On the other hand, if it is determined at block 206 that the gate paddle is operating in the locked state (i.e., blocking passage through the gate), process 200 continues to block 212 wherein the gate paddle is opened. This can be done by, for example, transmitting a signal to the gate or the gate paddle that causes the gate paddle to operate in the open state.

Figure 3:
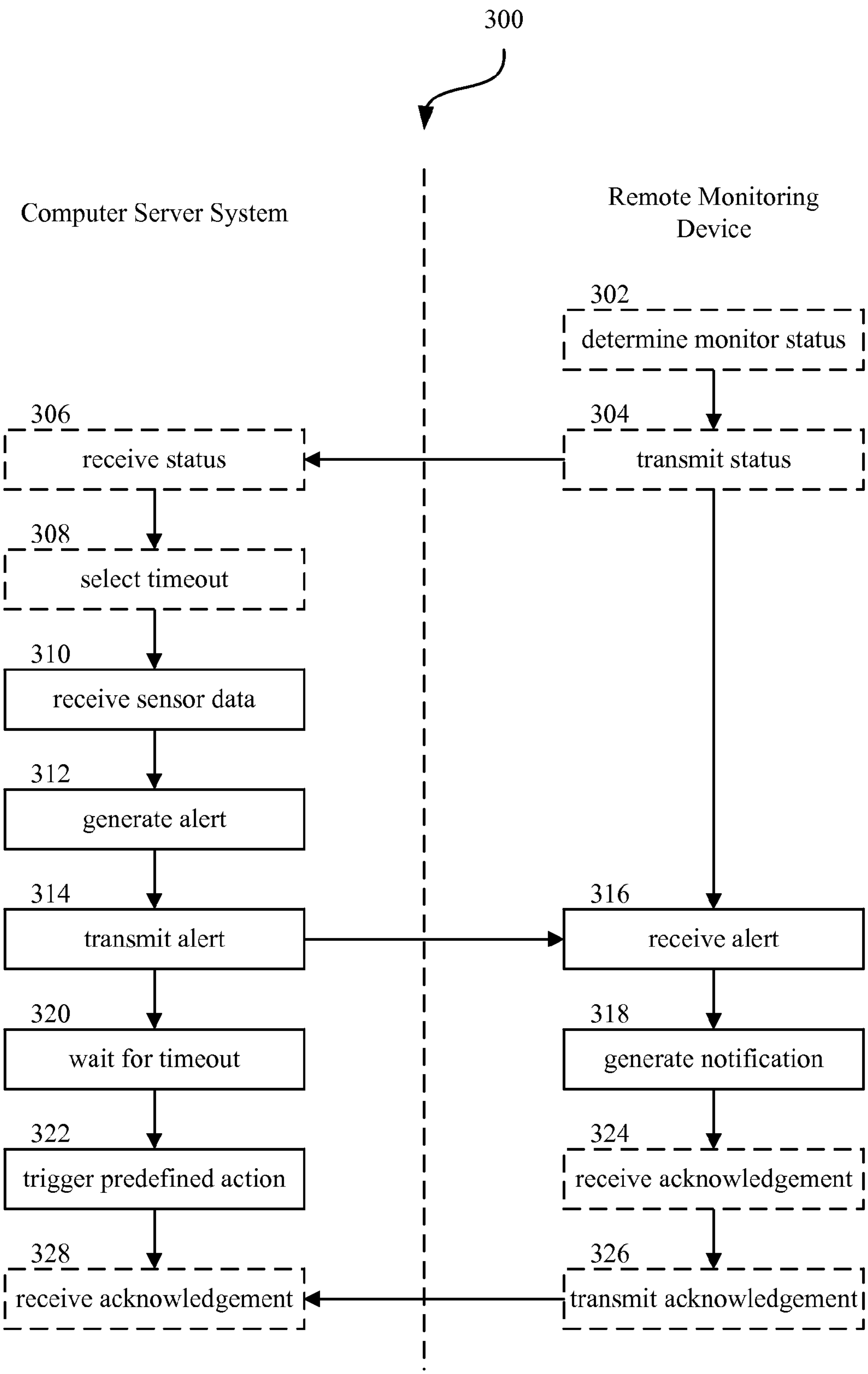
FIG. 3 is an interaction flowchart of an example embodiment of a process for enabling fail-safe operation of an automatic pedestrian access control gate during a health and safety event.

In some embodiments, process 200 can end at block 212 if the decisions at blocks 204 and 206 led process 200 to block 212. However, in this embodiment, one or more optional blocks can be performed to monitor the event and ensure that the event has been resolved. At block 214, process 200 waits for a preset period of time to allow time for the passenger to free himself or herself from the gate after opening the gate paddle. In other embodiments, block 214 can be omitted while still performing blocks 216-220. At block 216, optical sensor data from one or more optical sensors and/or video feed from one or more cameras are received. If video feed is received, the video feed is analyzed at block 218. Based on the optical sensor data and/or analysis of the video, a determination is made at block 220 of whether the passenger is still in the passageway. If the passenger is no longer in the passageway, then process 200 returns to block 202 to detect the next event. On the other hand, if it is determined that the passenger is still in the passageway, then process 200 continues to block 208 to generate an alert and block 210 to transmit the alert to staff FIG. 3 is an interaction flowchart of an example embodiment of a process 300 for enabling fail-safe operation of an automatic pedestrian access control gate during a health and safety event. More specifically, this embodiment relates to automatic emergency gateline operations in case of non-delivery or non-acknowledgement of event alerts. This figure illustrates the interactions between a computer server system and a remote monitoring device, which can be a mobile device or a remote monitoring station.

In some embodiments, optional blocks 302-308 can be performed to vary the timeout value based on whether the remote monitoring device is being actively monitored. At block 302, the monitor status of the remote monitoring device is determined. The monitor status indicates whether the remote monitoring device being actively monitored and can be determined based on sensor input or user input. For example, if remote monitoring device includes a camera, the camera can be used to take a picture or video, which can be analyzed to determine whether a staff member is paying attention to the remote monitoring device. If the remote monitoring device includes inertial sensors, such as accelerometers, gyroscopes or magnetometers, input from the inertial sensors can be used to determine how much time has elapsed since there was a change or move in the position of the device. If the elapsed time is less than or equal to a preset threshold, then it can be determined that the device is being actively monitored. The monitoring status can also be determined based on user input. For example, the user of the device can be required to check-in at periodic intervals (e.g., every 10 minutes) by pressing a button, indicating that the device is being actively monitored. At block 304, the monitor status is transmitted from the remote monitoring device and at block 306, the computer server system receives the monitor status. Based on the monitor status, a timeout value is selected at block 308. For example, if the device is being actively monitored, a longer timeout value (e.g. 1 minute) can be selected than if the device is not being actively monitored (e.g., 30 seconds).

In other embodiments, process 300 starts at block 310, wherein gateline sensor data is received. Gateline sensor data can include, for example, data from gate paddle sensors, optical sensors, and video cameras. The gateline sensor data indicates that a health and safety event has occurred. In response to receiving the sensor data, an alert is generated at block 312. At block 314, the generated alert is transmitted by the computer server system and at block 316, the alert is received by the remote monitoring device. At block 318, the remote monitoring device generates a notification of the alert, which can be, for example, a visual notification displayed on a screen or an audible notification generated by a speaker. At block 320, the computer server system waits for the timeout period to elapse. The timeout period can be the timeout value that was selected at block 308 or it can be a default value if blocks 302-308 are not performed. After waiting for the timeout period to elapse, the computer server system triggers a predefined action at block 322, which can be, for example, transmitting a signal to a gate or gate paddle that opens the gate paddle.

Blocks 324-328 are shown only to illustrate the process that would occur if an acknowledgement is received. At block 324, the remote monitoring device receives the acknowledgement, which can be in the form of, for example, user input. At block 326, the remote monitoring device transmits the acknowledgement and at block 328, the computer server system receives the acknowledgement. If the acknowledgement is received before the timeout period elapsed, then block 322 would not be performed and the predefined action would not be triggered. However, in this embodiment, the acknowledgement is received after the timeout period elapsed.

Figure 4:
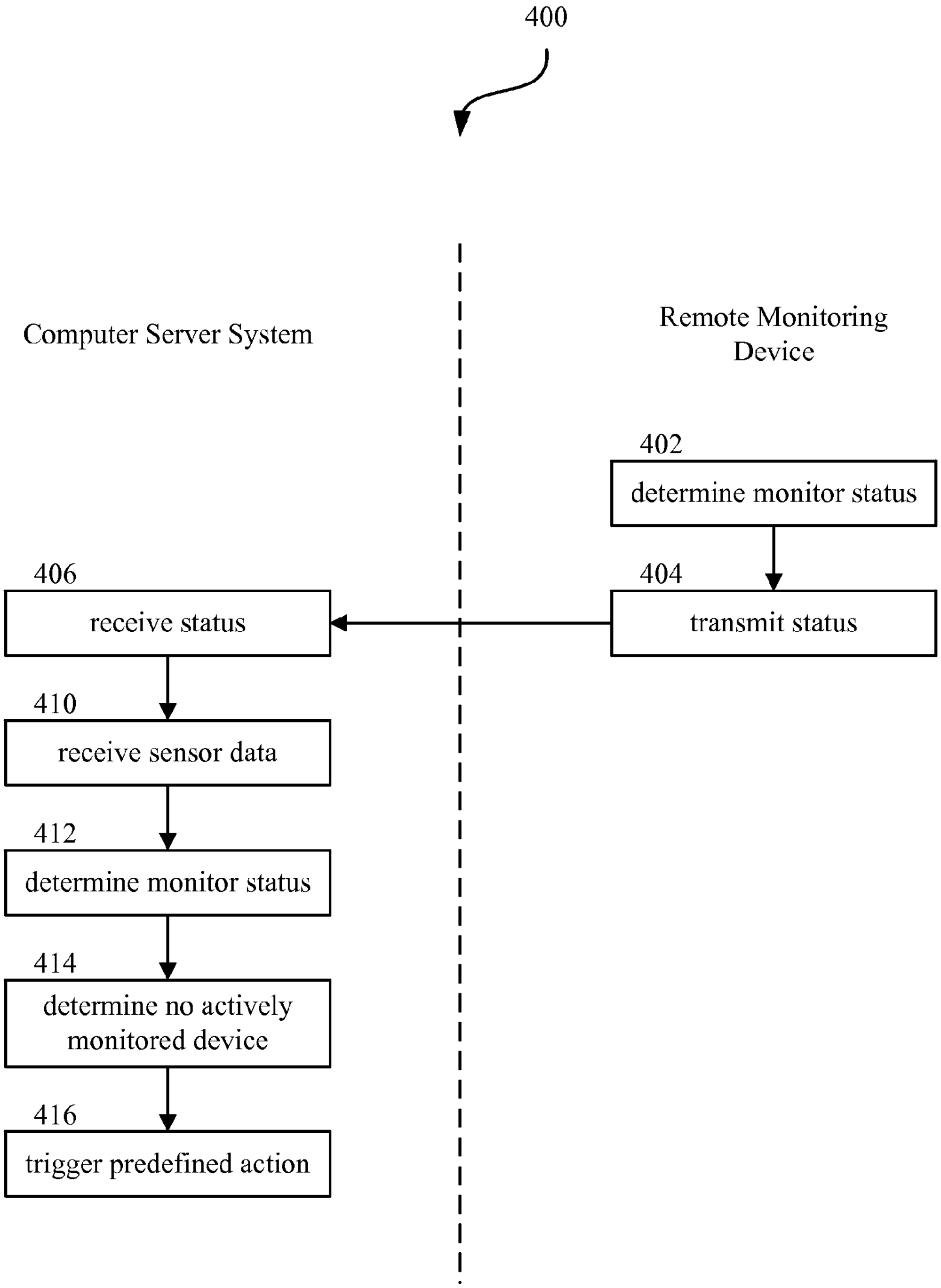
FIG. 4 is an interaction flowchart of another embodiment of a process for enabling fail-safe operation of an automatic pedestrian access control gate during a health and safety event.

FIG. 4 is an interaction flowchart of another embodiment of a process 400 for enabling fail-safe operation of an automatic pedestrian access control gate during a health and safety event. More specifically, this embodiment relates to automatic monitoring of the status of gateline operators or staff. This figure illustrates the interactions between a computer server system and a remote monitoring device. Although only one remote monitoring device is illustrated in this figure, it is understood that the same interactions can occur with any number of remote monitoring devices.

Process 400 starts at block 402, wherein the monitor status of the remote monitoring device is determined. The monitor status indicates whether the remote monitoring device being actively monitored and can be determined based on sensor input or user input. For example, if remote monitoring device includes a camera, the camera can be used to take a picture or video, which can be analyzed to determine whether a staff member is paying attention to the remote monitoring device. If the remote monitoring device includes inertial sensors, such as accelerometers, gyroscopes or magnetometers, input from the inertial sensors can be used to determine how much time has elapsed since there was a change or move in the position of the device. If the elapsed time is less than or equal to a preset threshold, then it can be determined that the device is being actively monitored. The monitoring status can also be determined based on user input. For example, the user of the device can be required to check-in at periodic intervals (e.g., every 10 minutes) by pressing a button, indicating that the device is being actively monitored.

At block 404, the monitor status is transmitted by the remote monitoring device. In one embodiment, the monitor status is the status that is determined at block 402. In another embodiment, the monitor status can be a heartbeat signal that is transmitted at regular intervals. Thus, if the remote monitoring device is turned on or being used, then a heartbeat signal is transmitted periodically (e.g., every 5 minutes). In some embodiments, a user interface can be provided on the remote monitoring device that allows the operator or staff to make user inputs (e.g., press different buttons) to indicate that the operator is online, taking a break, returning from the break, or logging off. If the operator is online and not taking a break, then the heartbeat signal is transmitted. If the operator if logged off or taking a break, then the heartbeat signal is not transmitted.

At block 406, the computer server system receives the monitor status, which can be the status determined at block 402 or the heartbeat signal. At block 410, gateline sensor data is received from one or more gateline sensors. The gateline sensor data indicates that a health and safety event has occurred. At block 412, the computer server system determines the current monitor status of each remote monitoring device based on the monitor status received at block 406. If the monitor status is a heartbeat signal, then a remote monitoring device is not being actively monitored if the heartbeat signal has not been received after the time interval of the heartbeat signal has elapsed since the previous heartbeat signal was received from the remote monitoring device. At block 414, it is determined that none of the remote monitoring devices are being actively monitored based on the monitor status of each remote monitoring device. At block 416, a predefined action (e.g., opening the gate) is triggered based on the sensor data received at block 410 and the determination made at block 414.

Figure 5:
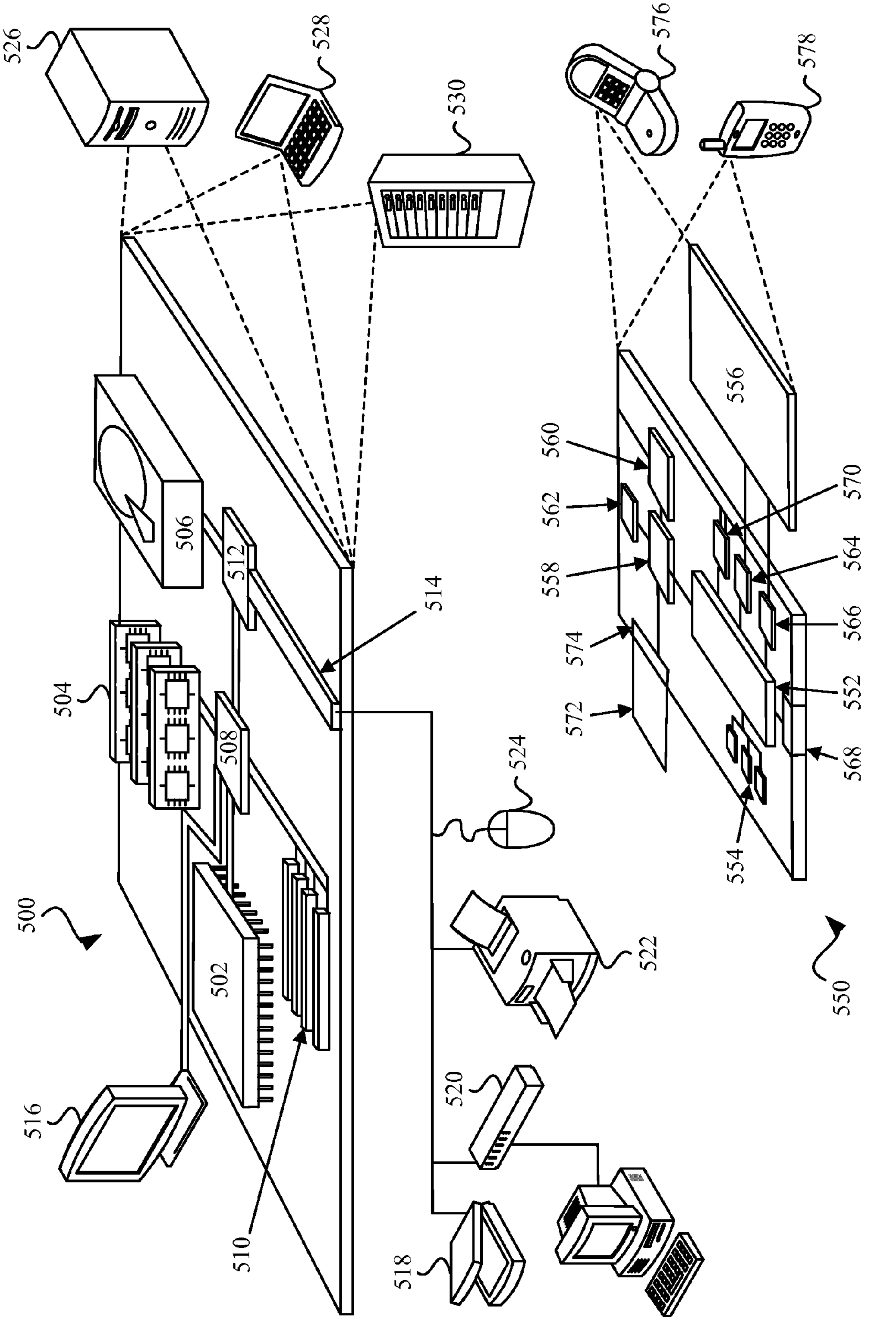
FIG. 5 is an illustration of embodiments of a special-purpose computer system and a computing device that can be used to implement a system for enabling fail-safe operation of an automatic pedestrian access control gate during a health and safety event.

FIG. 5 is an illustration of embodiments of a special-purpose computer system 500 and a computing device 550 that can be used to implement a system for enabling fail-safe operation of an automatic pedestrian access control gate during a health and safety event. Special-purpose computer system 500 represents various forms of digital computers, such as laptops, desktops, workstations, personal digital assistants, servers, blade servers, mainframes, and other appropriate computers. Computing device 550 represents various forms of mobile devices, such as personal digital assistants, cellular telephones, smart phones, tablets, laptops and other similar computing devices.

Computer system 500 includes a processor 502, random access memory (RAM) 504, a storage device 506, a high speed controller 508 connecting to RAM 504 and high speed expansion ports 510, and a low speed controller 512 connecting to storage device 506 and low speed expansion port 514. The components 502, 504, 506, 508, 510, 512, and 514 are interconnected using various busses, and may be mounted on a common motherboard or in other manners as appropriate. Computer system 500 can further include a number of peripheral devices, such as display 516 coupled to high speed controller 508. Additional peripheral devices can be coupled to low speed expansion port 514 and can include an optical scanner 518, a network interface 520 for networking with other computers, a printer 522, and input device 524 which can be, for example, a mouse, keyboard, track ball, or touch screen.

Processor 502 processes instructions for execution, including instructions stored in RAM 504 or on storage device 506. In other implementations, multiple processors and/or multiple busses may be used, as appropriate, along with multiple memories and types of memory. RAM 504 and storage device 506 are examples of non-transitory computer-readable media configured to store data such as a computer program product containing instructions that, when executed, cause processor 502 to perform methods and processes according to the embodiments described herein. RAM 504 and storage device 506 can be implemented as a floppy disk device, a hard disk device, an optical disk device, a tape device, a flash memory or other similar solid-state memory device, or an array of devices, including devices in a storage area network or other configurations.

High speed controller 508 manages bandwidth-intensive operations for computer system 500, while low speed controller 512 manages lower bandwidth-intensive operations. Such allocation of duties is exemplary only. In one embodiment, high speed controller 508 is coupled to memory 504, display 516 (e.g., through a graphics processor or accelerator), and to high speed expansion ports 510, which can accept various expansion cards (not shown). In the embodiment, low speed controller 512 is coupled to storage device 506 and low speed expansion port 514. Low speed expansion port 514 can include various communication ports or network interfaces, such as universal serial bus (USB), Bluetooth, Ethernet, and wireless Ethernet.

Computer system 500 can be implemented in a number of different forms. For example, it can be implemented as a standard server 526, or multiple servers in a cluster. It can also be implemented as a personal computer 528 or as part of a rack server system 530. Alternatively, components from computer system 500 can be combined with other components in a mobile device (not shown), such as device 550. Each of such devices can contain one or more of computer system 500 or computing device 550, and an entire system can be made up of multiple computer systems 500 and computing devices 550 communicating with each other.

Computing device 550 includes a processor 552, memory 554, an input/output device such as a display 556, a communication interface 558, and a transceiver 560, among other components. The components 552, 554, 556, 558, and 560 are interconnected using various busses, and several of the components may be mounted on a common motherboard or in other manners as appropriate. Computing device 550 can also include one or more sensors, such as GPS or A-GPS receiver module 562, cameras (not shown), and inertial sensors including accelerometers (not shown), gyroscopes (not shown), and/or magnetometers (not shown) configured to detect or sense motion or position of computing device 550.

Processor 552 can communicate with a user through control interface 564 and display interface 566 coupled to display 556. Display 556 can be, for example, a thin-film transistor (TFT) liquid-crystal display (LCD), an organic light-emitting diode (OLED) display, or other appropriate display technology. Display interface 566 can comprise appropriate circuitry for driving display 556 to present graphical and other information to the user. Control interface 564 can receive commands from the user and convert the commands for submission to processor 552. In addition, an external interface 568 can be in communication with processor 552 to provide near area communication with other devices. External interface 568 can be, for example, a wired communication interface, such as a dock or USB, or a wireless communication interface, such as Bluetooth or near field communication (NFC).

Device 550 can also communicate audibly with the user through audio codec 570, which can receive spoken information and convert it to digital data that can be processed by processor 552. Audio codec 570 can likewise generate audible sound for the user, such as through a speaker. Such sound can include sound from voice telephone calls, recorded sound (e.g., voice messages, music files, etc.), and sound generated by applications operating on device 550.

Expansion memory 572 can be connected to device 550 through expansion interface 574. Expansion memory 572 can provide extra storage space for device 550, which can be used to store applications or other information for device 550. Specifically, expansion memory 572 can include instructions to carry out or supplement the processes described herein. Expansion memory 572 can also be used to store secure information.

Computing device 550 can be implemented in a number of different forms. For example, it can be implemented as a cellular telephone 576, smart phone 578, personal digital assistant, tablet, laptop, or other similar mobile device.

It is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for enabling fail-safe operation of an automatic pedestrian access control gate during a health and safety event, the system comprising:

a gate paddle configured to operate in an open state and a locked state, wherein pedestrian passage through the access control gate is granted while the gate paddle is operating in the open state, and wherein pedestrian passage through the access control gate is blocked while the gate paddle is operating in the locked state;

a gate paddle sensor configured to detect a position of the gate paddle; and a computer server system coupled to the gate paddle and the gate sensor, the computer server system being configured to:

receive gate paddle sensor data from the gate paddle sensor indicating the position of the gate paddle, determine, based on the gate paddle sensor data, that the gate paddle is stuck in an unnatural position that is different from a natural resting position of the gate paddle during normal operation, determine that the gate paddle is currently operating in the locked state, and transmit an alert to a remote monitoring device;

determine whether the remote monitoring device is actively monitored;

select a timeout threshold based on the determination of whether the remote monitoring device is actively monitored, wherein the timeout threshold is different upon a determination that the remote monitoring device is actively monitored than upon a determination that the remote monitoring device is not actively monitored;

determine that an acknowledgement of the alert has not been received within the selected timeout threshold; and transmit a signal to the gate paddle that causes the gate paddle to operate in the open state based on determining that the gate paddle is stuck in the unnatural position, determining that the gate paddle is currently operating in the locked state, and determining that the acknowledgement has not been received within the selected timeout threshold.

2. The system of claim 1, wherein the computer server system determines that the gate paddle is stuck in the unnatural position by tracking a period of time that the gate paddle is in the unnatural position, and determining that the period of time is greater than or equal to a preset threshold.

3. The system of claim 1, wherein the computer server system is further configured to:

determine that the gate paddle is currently operating in the open state;

generate an alert based on determining that the gate paddle is stuck in the unnatural position and determining that the gate paddle is currently operating in the open state; and transmit the alert to a remote monitoring device.

4. The system of claim 1, further comprising:

an optical sensor configured to detect presence of an object within a passageway of the access control gate;

wherein the computer server system is further configured to:

receive optical sensor data from the optical sensor, the optical sensor data indicating that the object is present within the passageway, generate an alert in response to receiving the optical sensor data, and transmit the alert to a remote monitoring device.

5. The system of claim 4, wherein the computer server system is further configured to:

wait for a preset period of time to pass after transmitting the signal to the gate paddle that causes the gate paddle to operate in the open state and before generating the alert.

6. The system of claim 1, further comprising:

a video camera aimed at an area that includes the access control gate;

wherein the computer server system is further configured to:

receive a video feed from the video camera, analyze the video feed, determine that a pedestrian is present within a passageway of the access control gate based on analyzing the video feed, generate an alert in response to determining that the pedestrian is present within the passageway, and transmit the alert to a remote monitoring device.

7. The system of claim 6, wherein the computer server system is further configured to:

extract a clip from the video feed, the clip including the health and safety event; and transmit the clip to the remote monitoring device.

* * * * *